(12) United States Patent
Kobayashi

(10) Patent No.: US 7,609,319 B2
(45) Date of Patent: Oct. 27, 2009

(54) METHOD AND APPARATUS FOR DETERMINING FOCUSING POSITION

(75) Inventor: Koji Kobayashi, Asaka (JP)

(73) Assignee: Fujifilm Corporation, Tokyo (JP)

( * ) Notice: Subject to any disclaimer, the term of this patent is extended or adjusted under 35 U.S.C. 154(b) by 407 days.

(21) Appl. No.: 11/704,238

(22) Filed: Feb. 9, 2007

(65) Prior Publication Data

US 2008/0012949 A1 Jan. 17, 2008

(30) Foreign Application Priority Data

Feb. 9, 2006 (JP) .............................. 2006-032088

(51) Int. Cl.
*H04N 5/232* (2006.01)
(52) U.S. Cl. ...................... 348/355; 348/356
(58) Field of Classification Search ............ 348/208.99, 348/208.1–206.6, 224.1, 229.1, 267–270, 348/342, 345–357

See application file for complete search history.

(56) References Cited

U.S. PATENT DOCUMENTS

| 5,003,339 | A | * | 3/1991 | Kikuchi et al. | ............... | 396/100 |
| 5,640,618 | A | | 6/1997 | Uchiyama | | |
| 5,715,483 | A | * | 2/1998 | Omata et al. | ................... | 396/80 |
| 5,842,059 | A | | 11/1998 | Suda | | |
| 7,181,049 | B2 | | 2/2007 | Ike | | |
| 7,391,461 | B2 | * | 6/2008 | Ogino | ......................... | 348/345 |

FOREIGN PATENT DOCUMENTS

| JP | 60-143068 | A | 7/1985 |
| JP | 6205268 | A | 7/1994 |
| JP | 8-75997 | A | 3/1996 |
| JP | 9-243906 | A | 9/1997 |
| JP | 10-39198 | A | 2/1998 |
| JP | 2002-334325 | A | 11/2002 |
| JP | 2003-107335 | A | 4/2003 |
| JP | 2004-320286 | A | 11/2004 |
| JP | 2004-325517 | A | 11/2004 |
| JP | 2005-173396 | A | 6/2005 |

* cited by examiner

*Primary Examiner*—Tuan V Ho
*Assistant Examiner*—Don Nguyen
(74) *Attorney, Agent, or Firm*—Birch, Stewart, Kolasch & Birch, LLP

(57) ABSTRACT

A photography device has an AF mechanism including: a CCD; an analog signal processing section; an image input controller; an AF processing section; a CPU; and a focusing lens driving section. The AF mechanism operates to focus an imaging lens on a subject. If an image represented by output from the CCD does not include a specific low contrast subject, image data representing the image is passed through a first high frequency filter that transmits components having frequencies greater than or equal to a first cutoff frequency, and a focus evaluation value is determined based on the transmitted components. If the image includes the specific subject, the image data is passed through a second high frequency filter that transmits components having frequencies greater than or equal to a second cutoff frequency, lower than the first cutoff frequency, and a focus evaluation value is determined based on the transmitted components.

16 Claims, 7 Drawing Sheets

METHOD AND APPARATUS FOR DETERMINING FOCUSING POSITION

BACKGROUND OF THE INVENTION

1. Field of the Invention

The present invention relates to a method and an apparatus for determining focusing positions in a photography device, such as a digital still camera having an automatic focus mechanism.

2. Description of the Related Art

Automatic focus (hereinafter referred to as AF) mechanisms, for focusing an imaging lens on a predetermined subject, are in wide use in photography devices such as digital still cameras and digital camcorders. As such AF mechanisms, mechanisms that utilize an active method and mechanisms that utilize passive methods are known. In the active method, an infrared ray is emitted from a photography device to a subject, and the distance to the subject is measured through detection of the angle of the infrared ray returning to the apparatus after being reflected by the subject. The position of an imaging lens is set to focus on the subject at the measured distance. In the passive methods, a state of focus is detected by processing an image signal output from imaging means of a photography device, and an imaging lens is set at a position realizing an optimal state of focus.

A phase detection method, wherein a state of focus is judged based on the amount of horizontal shift of the image of an object, and a contrast detection method, wherein a state of focus is judged based on the contrast of an image, are widely known as passive methods for use by AF mechanisms. Japanese Unexamined Patent Publication No. 2004-320286 discloses an AF mechanism that utilizes the contrast detection method. In this AF mechanism, an imaging lens is driven within a movable range for focusing, and images are obtained by imaging means during movement of the imaging lens. The imaging lens is set at a position corresponding to the peak value of a focus evaluation value that corresponds to a contrast value of the image.

Japanese Unexamined Patent Publication No. 2004-320286 also discloses a focusing position determining method that incorporates the aforementioned contrast detection method. In this method, the distance between the imaging lens and a subject is calculated, based on characteristic amounts of the subject (such as the size of a human face and the distance between eyes) represented by image signals output from the imaging means. A final focusing position is determined, based on both the calculated distance and the focusing position determined by the AF mechanism.

Japanese Unexamined Patent Publication No. 2004-325517 discloses a photography device that extracts high frequency components from image data, by transmitting the image data through high frequency filters, in order to detect contrast. In this photography device, two high frequency filters having different cutoff frequencies are provided. When obtaining focus evaluation values, a rough search and a fine search are conducted. The two high frequency filters are used as appropriate during the two searches.

When still photographs are obtained by a photography device equipped with an AF mechanism that utilizes the aforementioned contrast detection method, there are cases that images are photographed out of focus, if close up shots of human faces are included therein.

SUMMARY OF THE INVENTION

The present invention has been developed in view of the foregoing problem. It is an object of the present invention to provide a focusing position determining method to be employed by a photography device equipped with an AF mechanism that utilizes the contrast detection method which is capable of correctly focusing on subjects even if close up shots of human faces are included in images.

It is another object of the present invention to provide a focusing position determining apparatus capable of executing the focusing position determining method.

A first focusing position determining method of the present invention utilizes high frequency filters having different cutoff frequencies as appropriate, according to whether an image includes a specific subject, such as a human face. Specifically, the first focusing position determining method is that which is to be employed by a photography device, comprising:

an imaging lens;

imaging lens moving means, for moving the imaging lens along the direction of the optical axis thereof within a range of motion; and imaging means, for outputting an output signal that represents the contrast within an image;

the imaging lens, the imaging lens moving means, and the imaging means forming an automatic focusing mechanism that sets the imaging lens at a position at which a focus evaluation value that corresponds to the contrast within an image assumes a peak value;

the first focusing position determining method comprising the steps of:

judging whether a specific low contrast subject is included in an image represented by the output signal of the imaging means;

passing image data that represents the image through a first high frequency filter that only transmits high frequency components having frequencies greater than or equal to a first cutoff frequency, and obtaining the focus evaluation value based on the high frequency components transmitted by the first high frequency filter, in the case that the specific subject is not included in the image; and passing image data that represents the image through a second high frequency filter that only transmits high frequency components having frequencies greater than or equal to a second cutoff frequency, which is lower than the first cutoff frequency, and obtaining the focus evaluation value based on the high frequency components transmitted by the second high frequency filter, in the case that the specific subject is included in the image.

A second focusing position determining method of the present invention judges whether a focus evaluation value, obtained based on high frequency components which have been transmitted through the second high frequency filter in the case that the specific subject is included in the image, is reliable. The focus evaluation value is output to be subjected to a peak value detecting process only if the reliability is greater than or equal to a predetermined reliability threshold value. Specifically, the second focusing position determining method is that which is to be employed by a photography device, comprising:

an imaging lens;

imaging lens moving means, for moving the imaging lens along the direction of the optical axis thereof within a range of motion; and imaging means, for outputting an output signal that represents the contrast within an image;

the imaging lens, the imaging lens moving means, and the imaging means forming an automatic focusing mechanism that sets the imaging lens at a position at which a focus evaluation value that corresponds to the contrast within an image assumes a peak value;

the second focusing position determining method comprising the steps of:

judging whether a specific low contrast subject is included in an image represented by the output signal of the imaging means;

passing image data that represents the image through a first high frequency filter that only transmits high frequency components having frequencies greater than or equal to a first cutoff frequency, and obtaining the focus evaluation value based on the high frequency components transmitted by the first high frequency filter, in the case that the specific subject is not included in the image;

passing image data that represents the image through a second high frequency filter that only transmits high frequency components having frequencies greater than or equal to a second cutoff frequency, which is lower than the first cutoff frequency, and determining an unconfirmed focus evaluation value based on the high frequency components transmitted by the second high frequency filter, in the case that the specific subject is included in the image;

designating the unconfirmed focus evaluation value to be the focus evaluation value if the reliability of the unconfirmed focus evaluation value is greater than or equal to a predetermined reliability threshold value; and passing the image data through the first high frequency filter, obtaining a focus evaluation value based on the high frequency components transmitted by the first high frequency filter, and designating the focus evaluation value to be the focus evaluation value of the image that includes the specific subject, if the reliability of the unconfirmed focus evaluation value is less than the predetermined reliability threshold value.

Note that in the first and second focusing position determining methods of the present invention, it is desirable for the size of the specific subject to be obtained, based on the output signal from the imaging means and for the second cutoff frequency to be lowered the greater the size of the subject is.

It is also desirable for the specific subject to be a human face, or a facial component that constitutes a human face.

A first focusing position determining apparatus of the present invention executes the aforementioned first focusing position determining method, and is employed in a photography device, comprising:

an imaging lens;

imaging lens moving means, for moving the imaging lens along the direction of the optical axis thereof within a range of motion; and imaging means, for outputting an output signal that represents the contrast within an image;

the imaging lens, the imaging lens moving means, and the imaging means forming an automatic focusing mechanism that sets the imaging lens at a position at which a focus evaluation value that corresponds to the contrast within an image assumes a peak value;

the first focusing position determining apparatus comprising:

a first high frequency filter that only transmits high frequency components having frequencies greater than or equal to a first cutoff frequency;

a second high frequency filter that only transmits high frequency components having frequencies greater than or equal to a second cutoff frequency, which is lower than the first cutoff frequency;

judging means, for judging whether an image represented by output signals of the imaging means includes a specific low contrast subject;

control means, for inputting image data that represents the image into the first high frequency filter in the case that the judging means judges that the specific subject is not included in the image, and for inputting the image data into the second high frequency filter in the case that the judging means judges that the specific subject is included in the image; and means for obtaining the focus evaluation value, based on the high frequency components output from the first or second high frequency filter.

A second focusing position determining apparatus of the present invention executes the aforementioned second focusing position determining method, and comprises:

a first high frequency filter;

a second high frequency filter;

judging means;

control means;

means for obtaining evaluation values, all similar to those of the first focusing position determining apparatus; and focus evaluation value selecting means, for judging whether the reliability of the focus evaluation value determined based on the high frequency components output from the second high frequency filter is greater than or equal to a reliability threshold value, outputting the focus evaluation value to be subjected to peak value detection if the reliability is greater than or equal to a predetermined reliability threshold value, inputting the image data through the first high frequency filter, obtaining a focus evaluation value based on the high frequency components transmitted by the first high frequency filter to be subjected to peak value detection if the reliability is less than the predetermined reliability threshold value.

Note that it is desirable for the first and second focusing position determining apparatuses of the present invention to further comprise:

filter control means, for obtaining the size of the specific subject, based on the output signal from the imaging means, and lowering the second cutoff frequency the greater the size of the subject is.

It is also desirable for the judging means of the first and second focusing position determining apparatuses to judge whether a human face or a facial component that constitutes a human face is included in the image as the specific subject.

According to research by the present inventors, the aforementioned problem, regarding images becoming out of focus when low contrast subjects such as human faces are included therein, occurs for the following reason. During obtainment of the peak value of focus evaluation values based on the contrast within images, the peak detection accuracy deteriorates if low contrast subjects are included therein. The inventors have discovered that the peak value is capable of being detected more accurately, if high frequency filters having lower cutoff frequencies are utilized during photography of low contrast subjects.

In view of this new knowledge, the first focusing position method judges whether the image represented by the output signal from the imaging means includes the specific low contrast subject. In the case that the specific subject is not included in the image, the image data that represents the image is passed through the first high frequency filter that only transmits high frequency components having frequencies greater than or equal to the first cutoff frequency, and the focus evaluation value is obtained based on the transmitted high frequency components. On the other hand, in the case that the specific low contrast subject is included in the image, the image data that represents the image is passed through the second high frequency filter that only transmits high frequency components having frequencies greater than or equal to the second cutoff frequency, which is lower than the first cutoff frequency, and the focus evaluation value is obtained based on the transmitted high frequency components. Therefore, if the specific subject is a human face, which has comparatively low contrast, for example, the peak value of the focus evaluation value can be detected more accurately, and accordingly the image can focus on the subject with high accuracy.

The second focusing position determining method also judges whether the image represented by the output signal from the imaging means includes the specific low contrast subject. In the case that the specific subject is not included in the image, the image data is passed through the first high frequency filter, and the focus evaluation value is obtained based on the transmitted high frequency components. On the other hand, in the case that the specific low contrast subject is included in the image, the image data is passed through the second high frequency filter, and the focus evaluation value is obtained based on the transmitted high frequency components. Therefore, the aforementioned advantageous effects can be obtained. Further, the second focusing position determining method judges whether the focus evaluation value, which is obtained in the case that the image includes the specific subject, is reliable. In the case that the focus evaluation value is not reliable, the focus evaluation value obtained based on the high frequency components transmitted through the first high frequency filter is utilized in peak value detection, that is, setting of the position of the imaging lens. Therefore, incorrect focusing positions due to inaccurate peak value detection when the second high frequency filter, having a lower cutoff frequency than the first high frequency filter, is employed can be prevented.

Note that the accuracy in detection of the peak focus evaluation value deteriorates more conspicuously the larger the size a low contrast subject, such as a human face, within an image is. Therefore, a configuration may be adopted, wherein the size of the specific subject is obtained, based on the output signal from the imaging means, and the second cutoff frequency is lowered the greater the size of the subject is. In this case, the fact that the focusing accuracy deteriorates the larger the low contrast subject is within the image is compensated for, by lowering the second cutoff frequency. Accordingly, high focusing accuracy can be realized.

Meanwhile, the first focusing position determining apparatus of the present invention comprises: a first high frequency filter that only transmits high frequency components having frequencies greater than or equal to a first cutoff frequency; a second high frequency filter that only transmits high frequency components having frequencies greater than or equal to a second cutoff frequency, which is lower than the first cutoff frequency; judging means, for judging whether an image represented by output signals of the imaging means includes a specific low contrast subject; control means, for inputting image data that represents the image into the first high frequency filter in the case that the judging means judges that the specific subject is not included in the image, and for inputting the image data into the second high frequency filter in the case that the judging means judges that the specific subject is included in the image; and means for obtaining the focus evaluation value, based on the high frequency components output from the first or second high frequency filter. Therefore, the first focusing position determining apparatus is capable of executing the first focusing position determining method of the present invention.

The second focusing position determining apparatus of the present invention comprises: a first high frequency filter; a second high frequency filter; judging means; control means; means for obtaining evaluation values, all similar to those of the first focusing position determining apparatus; and focus evaluation value selecting means, for judging whether the reliability of the focus evaluation value determined based on the high frequency components output from the second high frequency filter is greater than or equal to a reliability threshold value, outputting the focus evaluation value to be subjected to peak value detection if the reliability is greater than or equal to a predetermined reliability threshold value, inputting the image data through the first high frequency filter, obtaining a focus evaluation value based on the high frequency components transmitted by the first high frequency filter to be subjected to peak value detection if the reliability is less than the predetermined reliability threshold value. Therefore, the second focusing position determining apparatus is capable of executing the second focusing position determining method of the present invention.

The first and second focusing position determining apparatuses of the present invention may further comprise: filter control means, for obtaining the size of the specific subject, based on the output signal from the imaging means, and lowering the second cutoff frequency the greater the size of the subject is. In this case, the fact that the focusing accuracy deteriorates the larger the low contrast subject is within the image is compensated for, by lowering the second cutoff frequency. Accordingly, high focusing accuracy can be realized.

DESCRIPTION OF THE PREFERRED EMBODIMENTS

Figure 1:
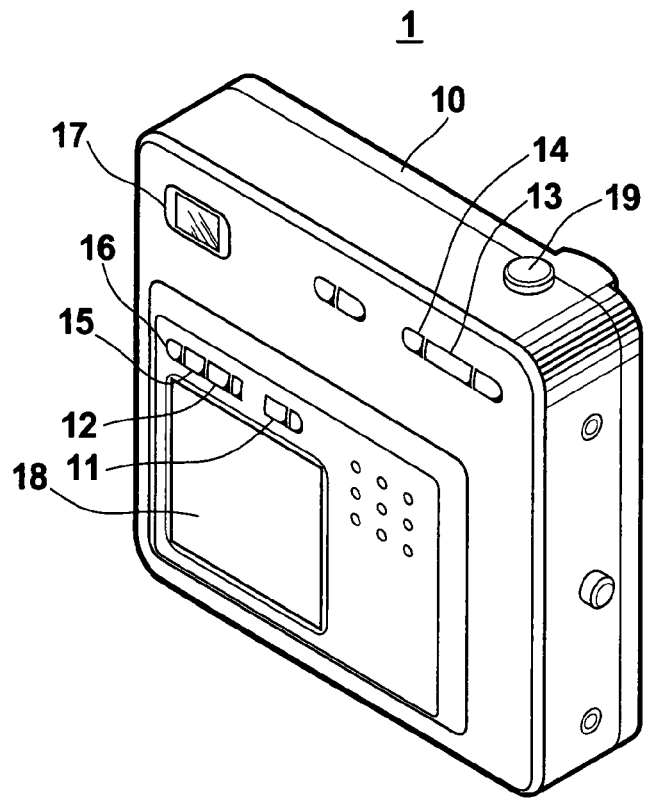
FIG. 1 is a rear view of a digital camera.
Figure 2:
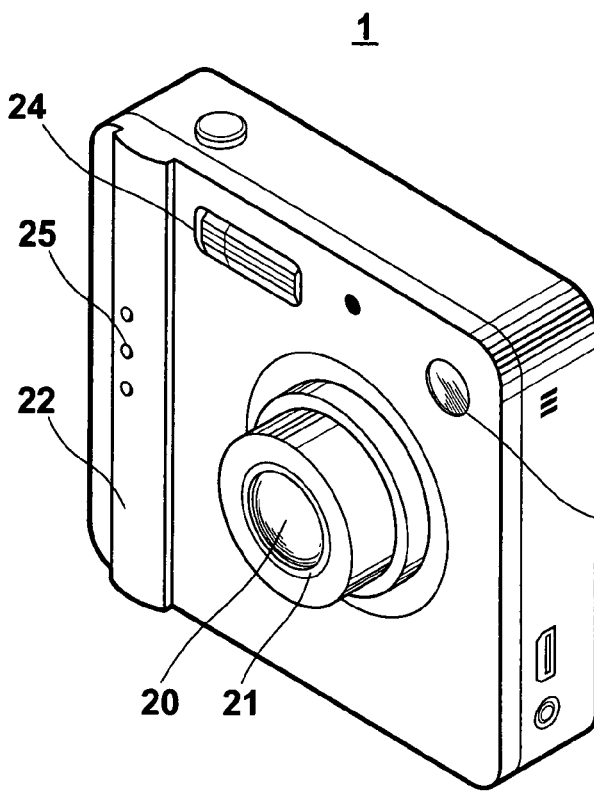
FIG. 2 is a front view of the digital camera.

Hereinafter, an embodiment of the present invention will be described with reference to the accompanying drawings. FIG. 1 and FIG. 2 illustrate an example of a digital still camera 1 (hereinafter, simply referred to as "digital camera 1") that executes a focusing position determining method according to first embodiment of the present invention. FIG. 1 is a rear view of the digital camera 1, and FIG. 2 is a front view of the digital camera 1.

As illustrated in FIG. 1, the digital camera 1 has an operation mode switch 11, a menu/OK button 12, a zoom/up-down lever 13, right-left arrow buttons 14, a Back button 15, and a display switching button 16, all of which serve as interfaces for operation by a photographer and are located at the rear of a body 10 thereof. In addition, the digital camera 1 has a viewfinder 17 for photography and a liquid crystal monitor 18 for photography and playback on the rear surface of the body 10. Further, a shutter button 19 is provided on the upper surface of the body 10.

As illustrated in FIG. 2, the body 10 of the digital camera 1 has an imaging lens unit 20, a lens cover 21, a power switch 22, a viewfinder window 23, a flash 24, and a self-timer lamp 25 located on the front surface thereof.

The operation mode switch 11 is a slide switch for changing the operation mode of the digital camera 1 among a still image photography mode, a moving image photography mode, and a playback mode. By pressing the menu/OK button 12, various menus for setting a photography mode, a flash emission mode, the number of pixels to be recorded, sensitivity, etc. are displayed on the liquid crystal monitor 18. The menu/OK button is also used to confirm settings and selections based on the menus displayed on the liquid crystal monitor 18.

When the zoom/up-down lever 13 is slid up or down during photography, zooming of the camera can be adjusted for telephotography or wide angle photography. When the lever 13 is slid up or down during input of various settings, a cursor in a menu screen displayed on the liquid crystal monitor 18 can be moved up or down. The right-left arrow buttons 14 are used to move the cursor to the right and to the left in a menu screen displayed on the liquid crystal monitor 18 during input of various settings.

Pressing the Back button 15 stops setting operations and displays an immediately preceding screen on the liquid crystal monitor 18. By pressing the display switching button 16, the liquid crystal monitor 18 and display of various guides and characters thereon can be turned on and off.

The contents of settings, input through operation of the buttons, the lever, and the switch, can be confirmed by display on the liquid crystal monitor 18, a lamp in the viewfinder, and the position of the slide lever, for example. The liquid crystal monitor 18 functions as an electronic viewfinder by displaying throughput images for confirmation of the subject at the time of photography. The liquid crystal monitor 18 also displays a still image or a moving image, which is played back after photography, in addition to the various kinds of menus.

Figure 3:
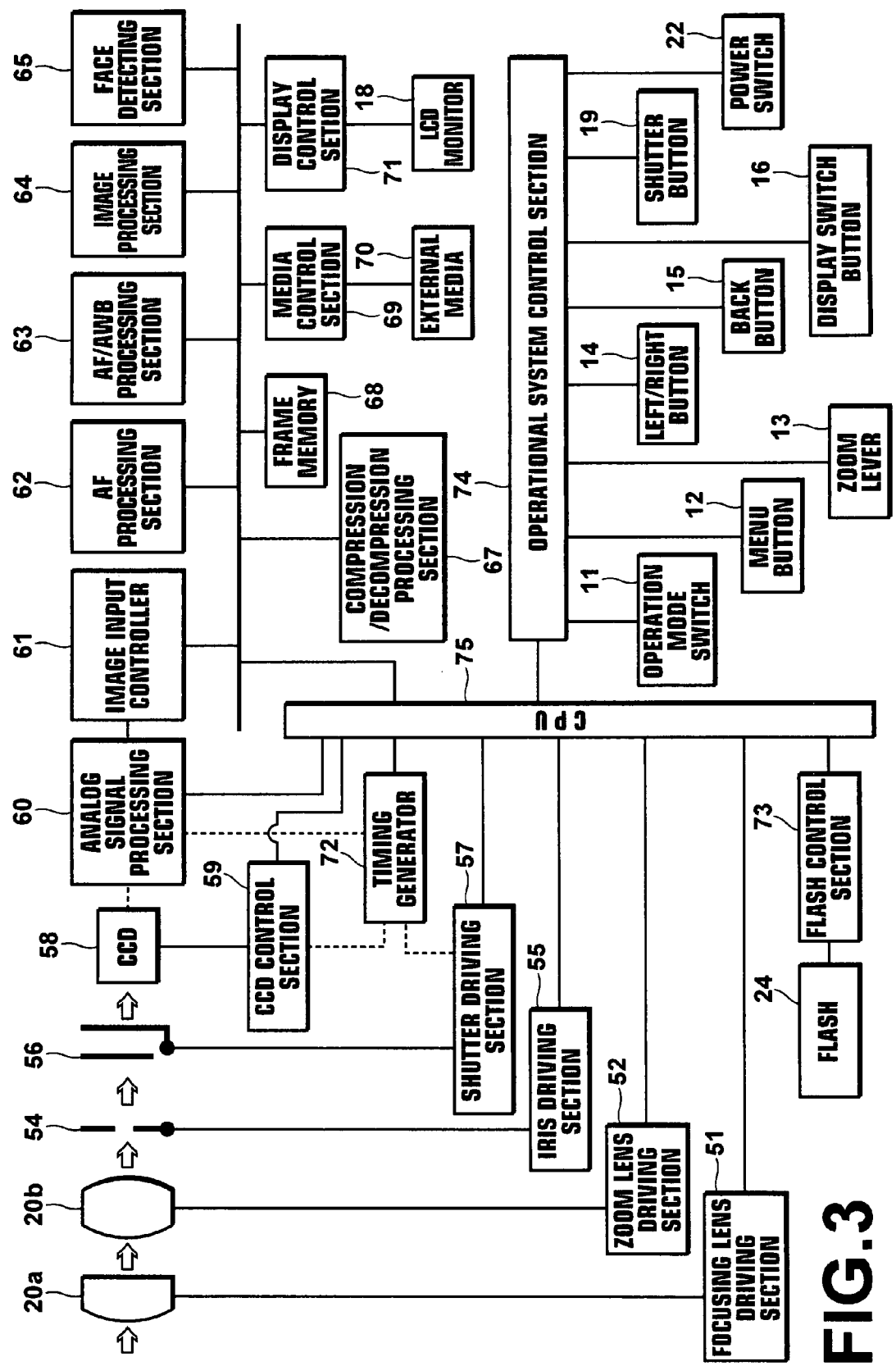
FIG. 3 is a functional block diagram of the digital camera.

FIG. 3 is a block diagram showing the electrical configuration of the digital camera 1. As illustrated in FIG. 3, the digital camera 1 converts image data of photographed images to an image file in Exif format, for example, and records the image file in an external recording medium 70, which is removably attached to the body 10. Accompanying data is recorded in the image file, in addition to the image data.

The digital camera 1 has an operational system including the operation mode switch 11, the menu/OK button 12, the zoom/up-down lever 13, the right-left arrow buttons 14, the Back button 15, the display switching button 16, the shutter button 19, and the power switch 22 described above. In addition, an operational system control section 74 that functions as an interface for sending the contents of operations to a CPU 75 (Central Processing section) is also provided in the operating system.

The imaging lens unit 20 comprises a focusing lens 20a and a zoom lens 20b. Each of the lenses can be moved along their optical axis by a focusing lens driving section 51 and a zoom lens driving section 52 each comprising a motor and a motor driver. The focusing lens driving section 51 controls the movement of the focusing lens 20a, based on focus driving data output from an AF processing section 62. The zoom lens driving section 52 controls the movement of the zoom lens 20b, based on data representing the operation of the zoom/up-down lever 13.

An iris 54 is driven by an iris driving section 55 comprising a motor and a motor driver. The iris driving section 55 adjusts the diameter of the iris 54 based on iris-value data output from an AE (Automatic Exposure)/AWB (Automatic White Balance) processing section 63.

A shutter 56 is a mechanical shutter and is driven by a shutter driving section 57 comprising a motor and a motor driver. The shutter driving section 57 opens and closes the shutter 56 according to a signal generated by depressing the shutter button 19 and according to shutter speed data output from the AE/AWB processing section 63.

A CCD 58 is provided as an imaging device is located at the rear of the optical system described above. The CCD 58 has a photoelectric surface, on which a plurality of photoreceptor elements are arranged two-dimensionally. Light from the subject passing through the optical system forms an image on the surface and is subjected to photoelectric conversion. A micro-lens array (not shown) for focusing the light on each pixel and a color filter array (not shown), in which filters for R, G, and B colors are arranged regularly, are located in front of the photoelectric surface. The CCD 58 outputs an electric charge stored at each of the pixels as serial analog image data for each line while synchronizing with a vertical transfer clock signal and a horizontal transfer clock signal supplied from a CCD control section 59. The time during which the electric charge is stored at each of the pixels, that is, an exposure time is determined by an electronic shutter driving signal output from the CCD control section 59.

Analog image data output from the CCD 58 is input to an analog signal processing section 60. The analog signal processing section 60 comprises a correlated double sampling (CDS) circuit for removing noise from the analog image signal, an automatic gain controller (AGC) for adjusting a gain of the analog image signal, and an A/D converter (ADC) for converting the analog image data into digital image data. The digital image data are CCD-RAW data having density values of R, G, and B for each of the pixels.

A timing generator 72 generates timing signals. Feeding of the timing signals to the shutter driving section 57, the CCD control section 59, and the analog signal processing section 60 synchronizes the operation of the shutter button 19 with the opening/closing of the shutter 56, input of the electric charge of the CCD 58, and processing by the analog signal processing section 60. A flash control section 73 controls light emission from the flash 24.

An image input controller 61 writes the CCD-RAW data input from the analog signal processing section 60 in a frame memory 68. The frame memory 68 is a memory used as workspace for various types of digital image-processes (signal processing) on the image data, which will be described later, and comprises an SDRAM (Synchronous Dynamic Random Access Memory) that carries out data transfer in synchronization with a bus clock signal of a predetermined period, for example.

A display control section 71 is used to display the image data stored in the frame memory 68 as a throughput image on the liquid crystal monitor 18. The display control section 71 converts luminance (Y) signals and color (C) signals into unified composite signals, and outputs the composite signals to the liquid crystal monitor 18. The throughput image is obtained at predetermined intervals and displayed on the liquid crystal monitor 18 when the photography mode is selected.

The AF processing section 62 and the AE/AWB processing section 63 determine photography conditions based on a preliminary image. The preliminary image is an image represented by the image data stored in the frame memory 68 as a result of preliminary imaging carried out by the CCD 58 instructed by the CPU 75, which has detected a half-press signal generated by a half depression of the shutter button 19.

The AF processing section 62 detects a focusing position based on the preliminary image, and outputs focus driving data. The aforementioned passive method, in which a characteristic that the contrast of images increases in a focused state is utilized, is applied in the present embodiment. Note that this point will be described in detail later.

The AE/AWB processing section 63 measures the luminance of the subject based on the preliminary image, and determines an iris value, a shutter speed, and the like based on the luminance. The AE/AWB processing section then outputs the data of the iris value and the shutter speed (AE processing), and adjusts white balance at the time of photography (AWB processing).

An image processing section 64 administers image quality enhancement processes such as Gamma correction, sharpness correction, and contrast correction on image data of a final image. The image processing section 64 also administers YC processes to convert the CCD-RAW data into YC data comprising Y data as a luminance signal, Cb data as a blue color difference signal, and Cr data as a red color difference signal. The final image is an image based on the image data stored in the frame memory 68 via the analog signal processing section 60 and the image input controller 61 after input of the analog image data from the CCD 58, in response to a full depression of the shutter button 19. The maximum number of pixels of the final image is determined by the number of the pixels of the CCD 58. However, the number of pixels to be recorded can be changed by the user, by setting the image quality to fine or normal, for example. The number of pixels of the throughput image and the preliminary image may be less than that of the final image, and may be 1/16 that of the final image, for example.

A compression/decompression unit 67 carries out compression processes to a format such as JPEG on the image data, which has been subjected to the image enhancement processes and the like by the image processing section 64, and generates an image file. Accompanying information is added as tags to the image file, based on the Exif format. The compression/decompression unit 67 also reads compressed images files from the external recording medium 70 in the playback mode, and administers decompression processes thereon. Image data, on which the decompression processes have been administered, are displayed on the liquid crystal monitor 18.

The media control section 69 carries out image-file reading and writing from and to the external recording medium 70.

The CPU 75 controls each of the units of the digital camera 1 in response to operations input to the operational system, such as the operation mode switch 11, as well as signals from the various processing sections, such as the AF processing section 62. A data bus 76 is connected to the image input controller 61, the various processing sections 62 to 67, the frame memory 68, the control sections 69 and 71, and the CPU 75. Digital image data and the like are transmitted through the data bus 76.

Hereinafter, the processes controlled by the CPU 75 when photography is performed by the digital camera 1 will be described with reference to the flow chart of FIG. 4. Note that the basic processes performed by the AF processing section 62 and the AE/AWB processing section 63 are as described above. Detailed descriptions of the processes performed by each of the processing sections will be omitted insofar as they are not particularly necessary, and the description will focus mainly on processes controlled by the CPU 75.

Figure 4:
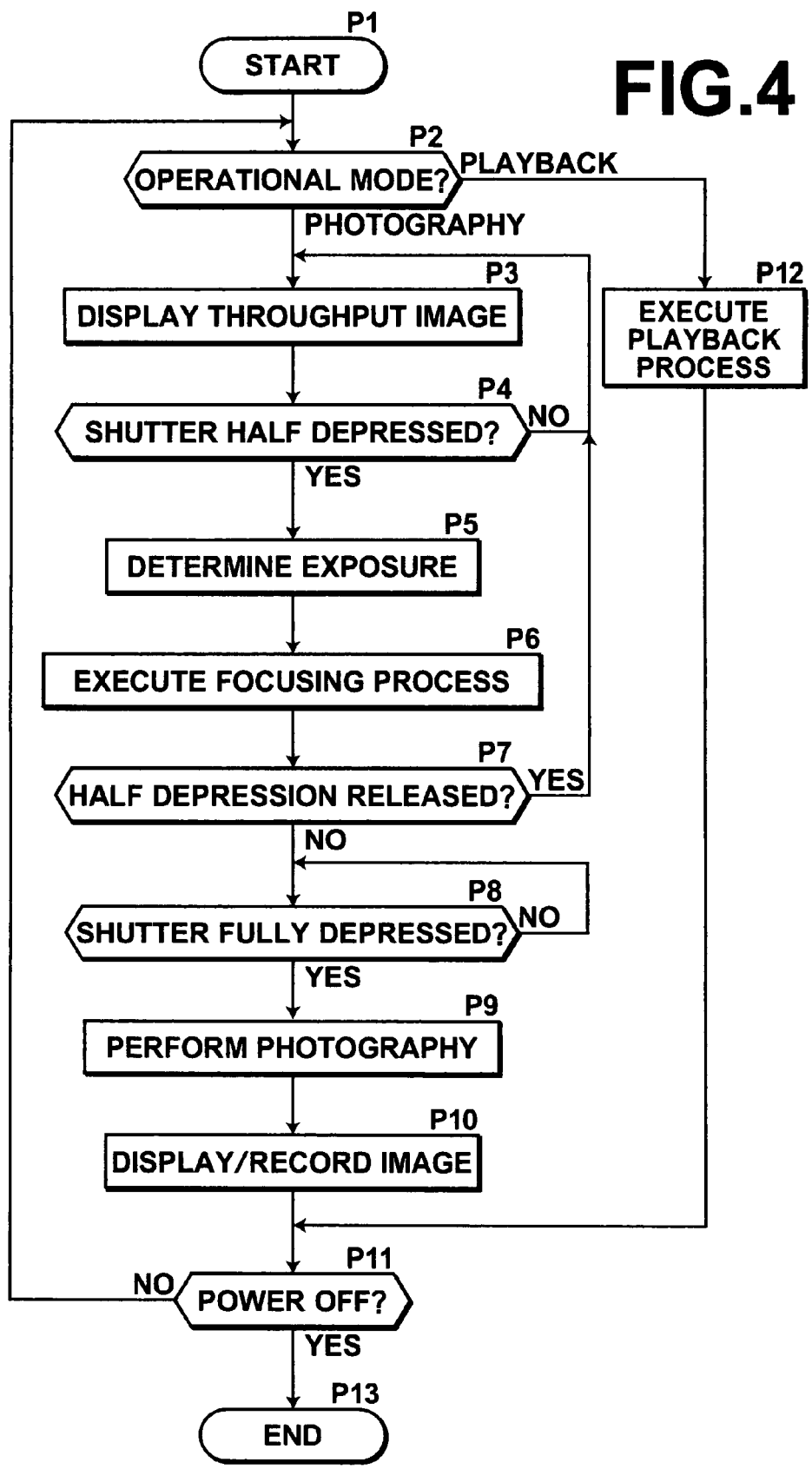
FIG. 4 is a flowchart that illustrates a photography process carried out by the digital camera.

The processing starts at step P1 of FIG. 4. At step P2, the CPU 75 judges whether the operation mode is the photography mode or the playback mode. In the case that the operation mode is the playback mode, playback processes are carried out at step P12. The playback processes, image files stored in the external recording medium 70 are read out, and images based on image data in the image files are displayed on the liquid crystal monitor 18. After completion of the playback processes, the flow of processing returns to step P1.

In the case that the operation mode has been judged to be the photography mode at Step P2, the CPU 75 carries out throughput image display control, at step P3. Throughput image display refers to display of the preliminary image on the liquid crystal monitor 18. The CPU 75 then judges whether the shutter button 19 has been pressed halfway, at step P4. In the case that the result of judgment at step P2 is negative, the flow of processing returns to step P3. If the result of judgment at step P4 is affirmative, an exposure determination command is issued to the AE/AWB processing section 63, and exposure is determined at step P5.

Next, an AF processing command is issued to the AF processing section 62, and AF processes are performed at step P6. Details of the AF processes will be described in detail later. After the AF processes are performed, whether the shutter button 19 has been released from the half-pressed state is judged, at step P7. If the result of judgment at step P7 is affirmative, the CPU 75 returns the flow of processing to step P3. If the result of judgment at step P7 is negative, the CPU 75 judges whether the shutter button 19 has been fully depressed, at step P8. If the result of judgment at step P8 is negative, the procedure at step P8 is repeated. If the result of judgment at step P8 is affirmative, the CPU 75 carries out photography processes, at step P9.

After the photography processes are complete, the CPU 75 performs processes to cause the photographed image to be displayed on the liquid crystal monitor 18 and to record the image in the external recording medium 70, at step P10. The CPU 75 then judges whether operation of the power switch 22 has been carried out to switch the digital camera 1 off, at step P11. If the result of judgment at step P11 is negative, the CPU 75 returns the flow of processing to Step S1. If the result of judgment at step P11 is affirmative, the CPU 75 switches the power of the digital camera 1 off to end the flow of processing, at step P13.

The flow of processing in the focusing process of step P6 performed by the AF processing section 62 will be described next, with reference to the flow chart of FIG. 5. The process starts at step P21. Next, a process for detecting a human face within the preliminary image is performed at step P22. Known methods for face detection, such as those disclosed in Japanese Unexamined Patent Publication No. 2004-320286 and Japanese Unexamined Patent Publication No. 2005-242640, may be employed in the face detection process.

Whether the preliminary image includes a face is judged at step P23. In the case that it is judged that the preliminary image does not include a face, the flow of processing proceeds to step P27, and focus evaluation values are calculated. The focus evaluation calculating process will be described hereinafter.

Figure 6:
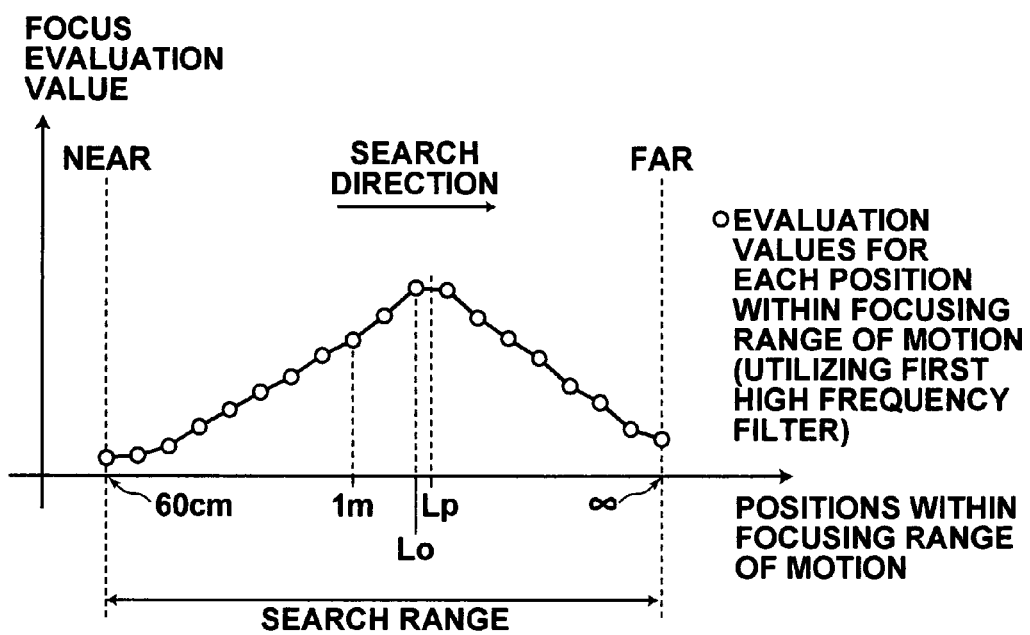
FIG. 6 is a graph that illustrates an example of the distribution of focus evaluation values for each focal position of a focusing lens.

First, the focusing lens driving section 51 moves the focusing lens 20*a* within the entire range of motion for focusing along the optical axis thereof, based on driving data output from the AF processing section 62. In the present embodiment, the focusing range of motion (search range) is a range that enables focusing on subjects which are 60 cm away at the closest and on subjects which are infinitely far away at the farthest. During movement of the focusing lens 20*a*, preliminary imaging is executed by the CCD 58, and image data obtained by the preliminary imaging is stored in the frame memory 68. The preliminary imaging is performed at predetermined positions of the focusing lens 20*a*, during stepwise increments of motion thereof. The AF processing section 62 obtains a focus evaluation value, based on the contrast of the image, for the preliminary image obtained at each of the positions of the focusing lens 20*a*. The AF processing section 62 administers filtering processes on image data that represents each preliminary image to obtain high frequency components thereof, and designates integrated absolute values of the high frequency components as the focus evaluation values. An example of focus evaluation values obtained for each position of the focusing lens 20*a* is illustrated in FIG. 6.

Note that the AF processing section 62 is equipped with a first high frequency filter (high pass filter) that only transmits high frequency components having frequencies greater than or equal to a first cutoff frequency f1, and a second high frequency filter (band pass filter) that only transmits high frequency components having frequencies greater than or equal to a second cutoff frequency f2, which is lower than the first cutoff frequency f1, and less than the first cutoff frequency f1. In step P27, the filtering processes are performed utilizing the first high frequency filter.

Next, a focusing position is determined, at step P28. Here, the AF processing section 62 obtains a position Lp, at which the focus evaluation value assumes its peak value, based on properties such as those illustrated in FIG. 6. The position Lp is obtained by an interpolation process or the like, and determined to be the focusing position.

Methods other than an interpolation process may be employed to obtain the focusing position Lp. For example, the position at which the maximum value of the focus evaluation value was actually obtained (position Lo in the example of FIG. 6) may be designated as the peak position. In the case that there are two positions at which the focus evaluation value assumes a maximum value, the position closer to the near side may be designated as the peak position.

In addition, it is not necessary to move the focusing lens within the entire focusing range of motion. For example, a "mountain climbing focusing movement" such as that disclosed in Japanese Unexamined Patent Publication No. 2004-048446 may be adopted. In this case, the focusing lens 20*a* needs only to be moved within a portion of the focusing range of motion. Thereby, the focusing operation can be expedited.

After the focusing position is determined in the manner described above, the focusing lens 20*a* is set to the determined focusing position, at step P29. That is, the focusing lens driving section 51 moves the focusing lens 20*a* to the focusing position and causes it to stop there, based on the focus driving data output from the AF processing section 62. When the focusing operation is completed in this manner, the flow of processing returns to the beginning thereof, at step P30.

On the other hand, in the case that it is judged that the preliminary image includes a face at step P23, the AF processing section 62 calculates the distance between the imaging lens unit 20 and the subject. The calculation of the distance to the subject is performed by utilizing image data that represents the preliminary images, stored in the frame memory 68. For example, the number of pixels that characteristic amounts of the imaged subject (such as the size of the face and the distance between eyes) correspond to on the CCD 58 is obtained, and the distance is calculated based on the number of pixels. Note that Japanese Unexamined Patent Publication No. 2004-320286 discloses the method for calculating distances in this manner in detail. The method disclosed in Japanese Unexamined Patent Publication No. 2004-320286 may be applied to the present embodiment.

After the distance to the subject is calculated, focus evaluation values are calculated at step P25. The calculation of focus evaluation values at step P25 is performed similarly to the calculation described in step P27 above. However, the filtering process is performed employing the second high frequency filter. An example of focus evaluation values obtained for each position of the focusing lens 20*a* is indicated by the black circles in the graph of FIG. 7.

Figure 7:
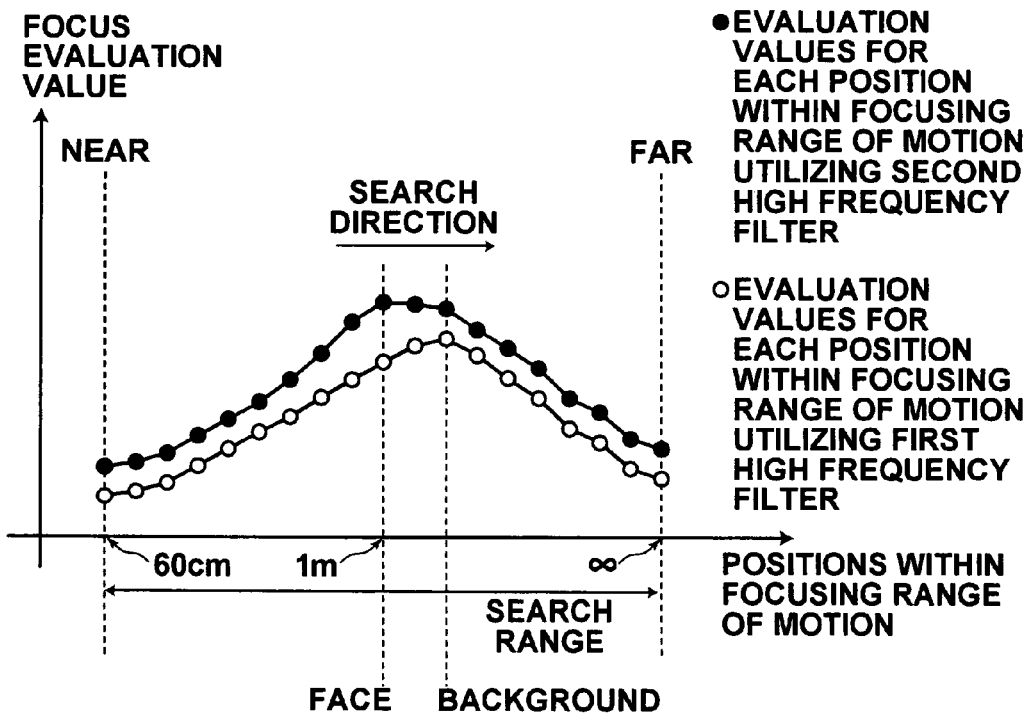
FIG. 7 is a graph that illustrates an example of the distribution of focus evaluation values for each focal position of a focusing lens, and for different high frequency filters.

In the case that a human face, which is low in contrast, is included in the preliminary image, and the filtering process is performed employing the first high frequency filter as in step P27, the distribution of focus evaluation values becomes that indicated by the white circles in the graph of FIG. 7. That is, if the composition of the image is set such that the face is positioned at the center of an imaging region, the focus evaluation value should assume its peak value at the face. However, if the first high frequency filter is employed, the focus evaluation value may assume its peak value at a position that does not correspond to the face.

In contrast, in the case that a human face is included in the preliminary image, and the filtering process is performed employing the second high frequency filter, which has a lower transmittance band, the focus evaluation value assumes its peak value at the position of the face, as illustrated by the black circles in the graph of FIG. 7. Then, the position at which the focus evaluation value assumes its peak value is determined to be the focusing position in step P26. Thereafter, the focusing lens 20*a* is set at the focusing position at step P29, to correctly focus on the face.

Note that in the present embodiment, the first cutoff frequency f1 and the second cutoff frequency f2 are values corresponding to spatial frequencies 18 (lp/mm) and 5.3 (lp/mm), respectively. The values of the cutoff frequencies f1 and f2 are not limited to these values. However, the favorable effects described above can be obtained if the values are set approximately to these levels.

In the present embodiment, whether the position at which the focus evaluation value assumes its peak value and the distance to the subject calculated in step P24 greatly differ is judged at step P26. The position at which the focus evaluation value assumes its peak value is determined to be the focusing position only after it is confirmed that the position and the distance to the subject do not differ greatly.

When the focusing operation is completed in this manner, the flow of processing returns to the beginning thereof, at step P30.

Figure 8:
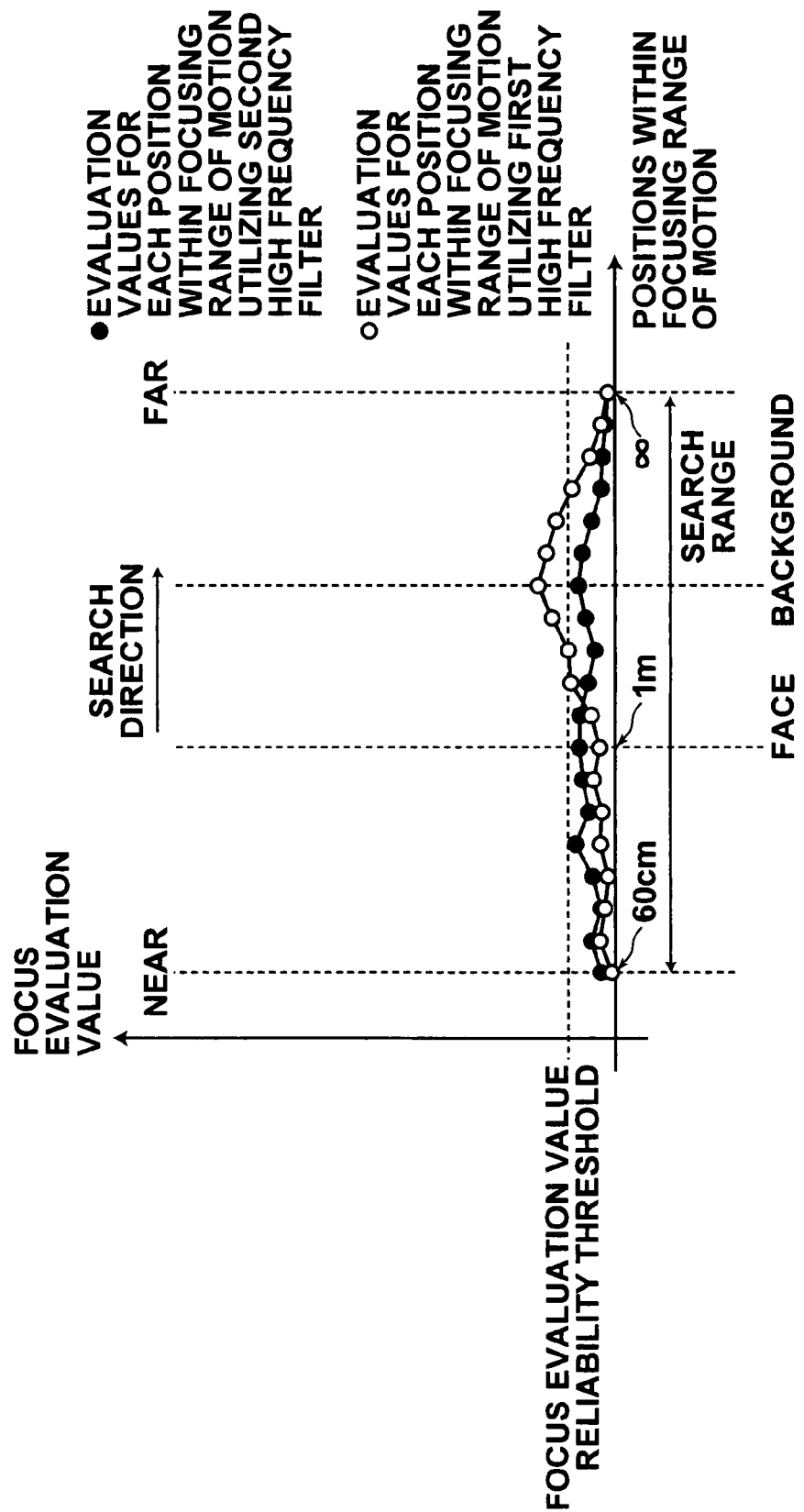
FIG. 8 is a graph that illustrates another example of the distribution of focus evaluation values for each focal position of a focusing lens, and for different high frequency filters.

Note that depending on the state of the subject, distributions of the focus evaluation values may be as those indicated in the graph of FIG. 8. The focus evaluation values for cases in which the first high frequency filter is employed and cases in which the second high frequency filter is employed are indicated by white circles and black circles, respectively. No apparent peak appears in the distribution indicated by the black circles, and all of the focus evaluation values are less than a predetermined reliability threshold value. Meanwhile, the distribution when the first high frequency filter is employed assumes its peak at a position that focuses on the background, instead of at a position that focuses on the face. In cases such as this, the background, which is not the main subject, may be focused on, by utilizing the first high frequency filter instead of the second high frequency filter, in order to maintain focusing performance at a low brightness side.

Figure 9:
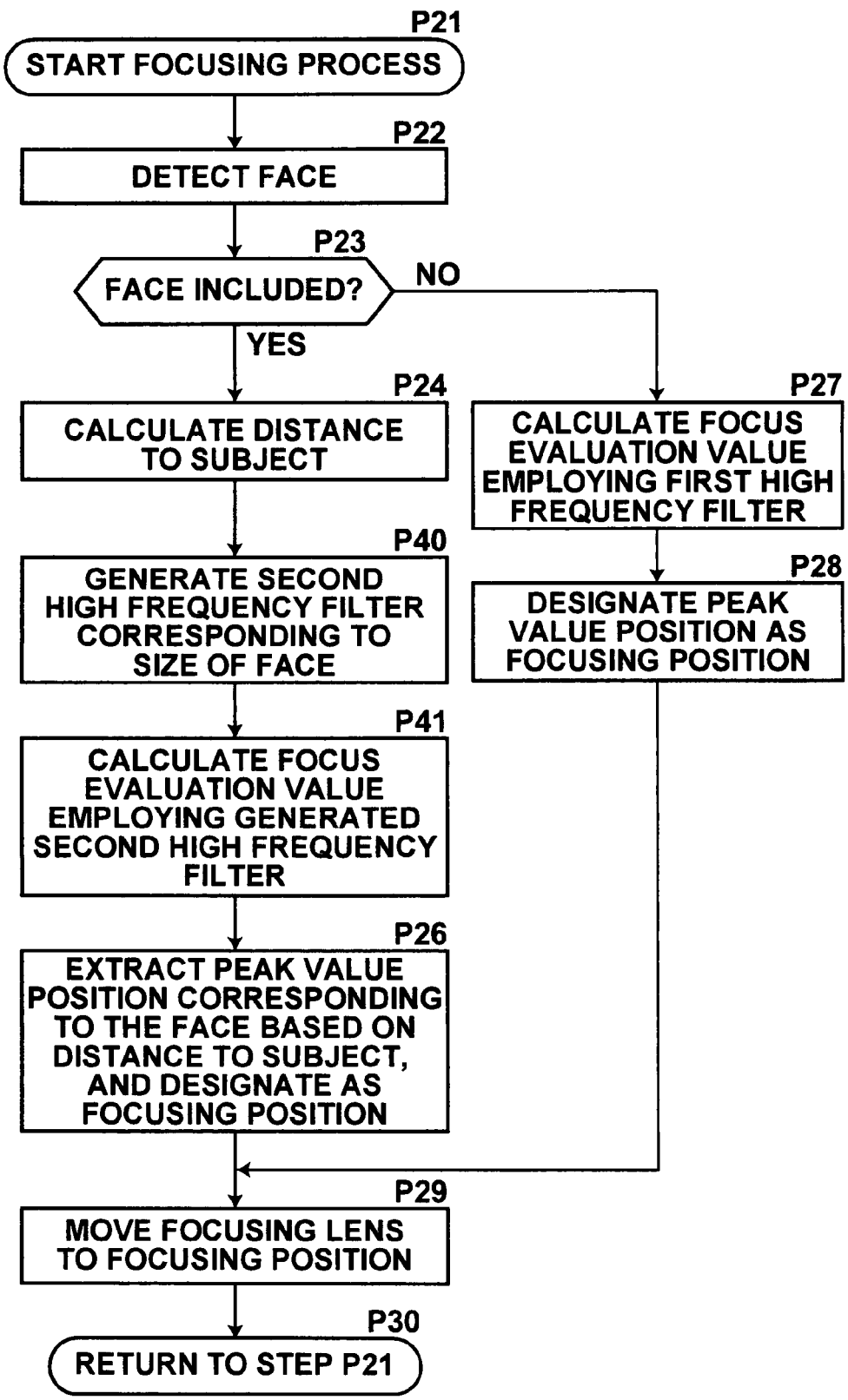
FIG. 9 is a flow chart that illustrates a focusing process according to a focusing position determining method of a second embodiment of the present invention.

Next, a focusing position determining method according to a second embodiment of the present invention will be described with reference to FIG. 9. A portion of the focusing process of the focusing position determining method of the second embodiment differs from that of the first embodiment. FIG. 9 is a flow chart that illustrates the focusing process in the second embodiment. Note that in FIG. 9 and the following description, steps which are equivalent to those illustrated in FIG. 5 are denoted with the same reference numerals, and detailed descriptions thereof will be omitted insofar as they are not particularly necessary.

Figure 5:
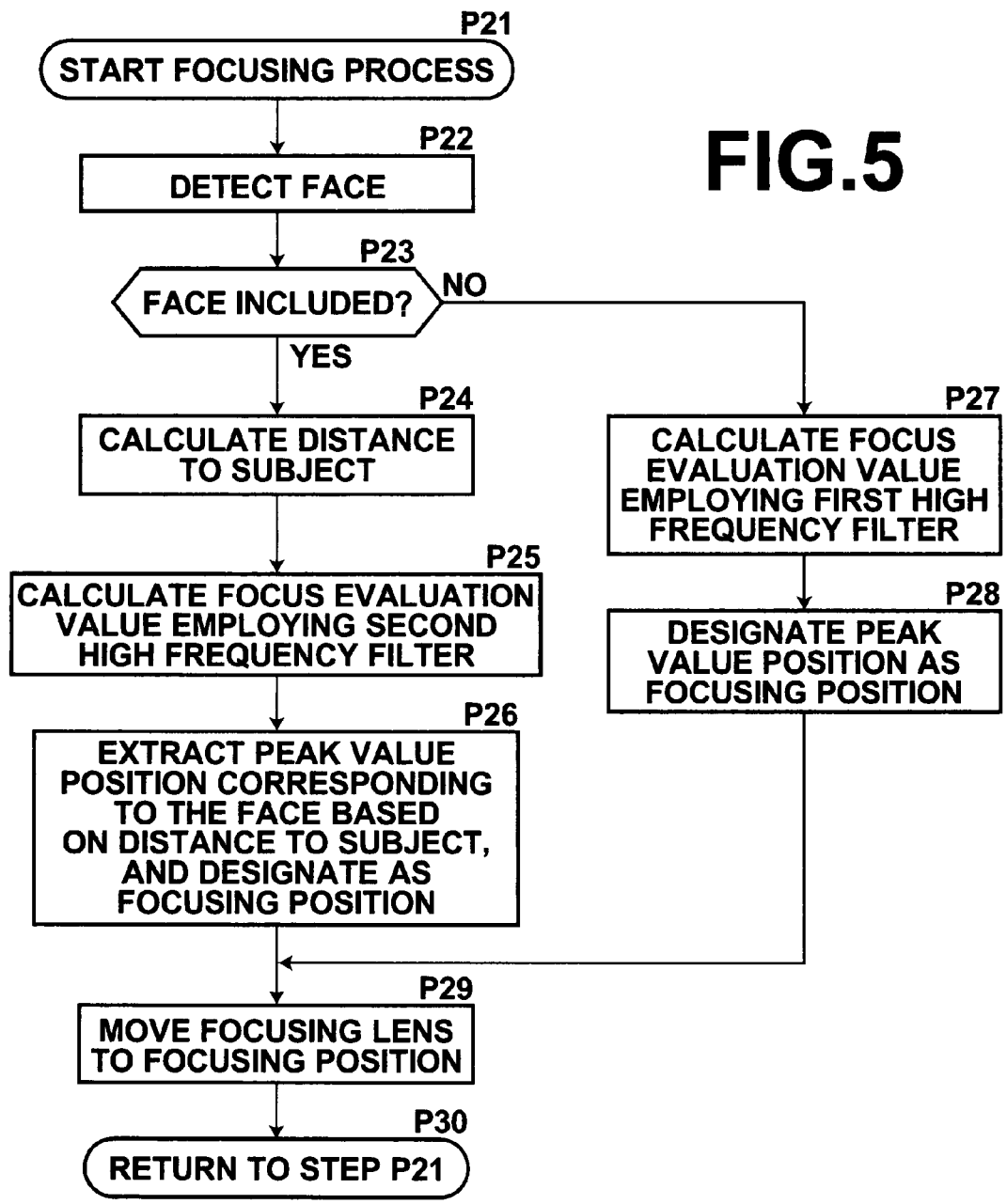
FIG. 5 is a flow chart that illustrates a focusing process carried out by the digital camera.

The focusing position determining method of the second embodiment comprises steps P40 and P41 instead of step P25 of FIG. 5. In the case that it is judged that the preliminary image includes a face in step P23, the distance to the subject is calculated in step P24, and then a second high frequency filter is generated in step P40. The generated second high frequency filter is basically the same as the second high frequency filter of the first embodiment, and the basic construction thereof is stored in an internal memory of the AF processing section 62. The AF processing section 62 changes the cutoff frequency f2 of the second high frequency filter, which is stored in the internal memory, such that it becomes lower the greater the size of the face detected in step P24 is. Individual second high frequency filters are generated for each focusing process.

Next, focus evaluation values are calculated at step P41. The calculation of focus evaluation values at step P41 is performed similarly to the calculation described in step P25 above, except that the second high frequency filter which is utilized differs. Thereafter, the position at which the focus evaluation value assumes its peak value is determined to be the focusing position in step P26. This process is the same as that performed in step P26 of FIG. 5.

In the second embodiment described above, the second cutoff frequency f2 is lowered the greater the size of the face is. In this case, the fact that the focusing accuracy deteriorates the larger the low contrast face is within the image is compensated for, by lowering the second cutoff frequency f2. Accordingly, high focusing accuracy can be realized.

Note that in the first and second embodiments described above, a bandpass filter that transmits high frequency components having frequencies greater than or equal to the cutoff frequency f2 and less than the cutoff frequency f1 is employed as the second high frequency filter. Alternatively, a high pass filter that transmits high frequency components having frequencies greater than or equal to the cutoff frequency f2 may be employed as the second high frequency filter. In this case as well, deterioration of focusing accuracy when comparatively low contrast subjects are included in images can be prevented.

The first and second embodiments described above were applied to digital still cameras. However, the present invention is not limited to application to digital still cameras. The present invention may be applied to all types of imaging devices that record still images or video images onto media such as photographic film, video tapes, and video disks.

What is claimed is:

1. A focusing position determining method to be incorporated in an automatic focusing method, comprising the steps of:
    moving an imaging lens along the direction of the optical axis thereof within a range of motion;
    outputting an output signal that represents the contrast within an image; and
    setting the imaging lens at a position at which a focus evaluation value that corresponds to the contrast within an image assumes a peak value;
    the focusing position determining method comprising the steps of:
    judging whether a specific low contrast subject is included in an image represented by the output signal of the imaging means;
    passing image data that represents the image through a first high frequency filter that only transmits high frequency components having frequencies greater than or equal to a first cutoff frequency, and obtaining the focus evaluation value based on the high frequency components transmitted by the first high frequency filter, in the case that the specific subject is not included in the image; and
    passing image data that represents the image through a second high frequency filter that only transmits high frequency components having frequencies greater than or equal to a second cutoff frequency, which is lower than the first cutoff frequency, and obtaining the focus evaluation value based on the high frequency components transmitted by the second high frequency filter, in the case that the specific subject is included in the image.

2. A focusing position determining method as defined in claim 1, wherein:
    the size of the specific subject is obtained, based on the output signal from the imaging means; and
    the second cutoff frequency is lowered the greater the size of the subject is.

3. A focusing position determining method as defined in claim 1, wherein:
    the specific subject is a human face, or a facial component that constitutes a human face.

4. A focusing position determining method as defined in claim 2, wherein:
    the specific subject is a human face, or a facial component that constitutes a human face.

5. A focusing position determining method to be employed by a photography device, comprising:
    an imaging lens;
    imaging lens moving means, for moving the imaging lens along the direction of the optical axis thereof within a range of motion; and
    imaging means, for outputting an output signal that represents the contrast within an image;
    the imaging lens, the imaging lens moving means, and the imaging means forming an automatic focusing mechanism that sets the imaging lens at a position at which a focus evaluation value that corresponds to the contrast within an image assumes a peak value;
    the focusing position determining method comprising the steps of:
    judging whether a specific low contrast subject is included in an image represented by the output signal of the imaging means;
    passing image data that represents the image through a first high frequency filter that only transmits high frequency components having frequencies greater than or equal to a first cutoff frequency, and obtaining the focus evaluation value based on the high frequency components transmitted by the first high frequency filter, in the case that the specific subject is not included in the image;

passing image data that represents the image through a second high frequency filter that only transmits high frequency components having frequencies greater than or equal to a second cutoff frequency, which is lower than the first cutoff frequency, and determining an unconfirmed focus evaluation value based on the high frequency components transmitted by the second high frequency filter, in the case that the specific subject is included in the image;

designating the unconfirmed focus evaluation value to be the focus evaluation value if the reliability of the unconfirmed focus evaluation value is greater than or equal to a predetermined reliability threshold value; and passing the image data through the first high frequency filter, obtaining a focus evaluation value based on the high frequency components transmitted by the first high frequency filter, and designating the focus evaluation value to be the focus evaluation value of the image that includes the specific subject, if the reliability of the unconfirmed focus evaluation value is less than the predetermined reliability threshold value.

6. A focusing position determining method as defined in claim 5, wherein:
the size of the specific subject is obtained, based on the output signal from the imaging means; and
the second cutoff frequency is lowered the greater the size of the subject is.

7. A focusing position determining method as defined in claim 5, wherein:
the specific subject is a human face, or a facial component that constitutes a human face.

8. A focusing position determining method as defined in claim 6, wherein:
the specific subject is a human face, or a facial component that constitutes a human face.

9. A focusing position determining apparatus to be employed in a photography device, comprising:
an imaging lens;
imaging lens moving means, for moving the imaging lens along the direction of the optical axis thereof within a range of motion; and
imaging means, for outputting an output signal that represents the contrast within an image;
the imaging lens, the imaging lens moving means, and the imaging means forming an automatic focusing mechanism that sets the imaging lens at a position at which a focus evaluation value that corresponds to the contrast within an image assumes a peak value;
the focusing position determining apparatus comprising:
a first high frequency filter that only transmits high frequency components having frequencies greater than or equal to a first cutoff frequency;
a second high frequency filter that only transmits high frequency components having frequencies greater than or equal to a second cutoff frequency, which is lower than the first cutoff frequency;
judging means, for judging whether an image represented by output signals of the imaging means includes a specific low contrast subject;
control means, for inputting image data that represents the image into the first high frequency filter in the case that the judging means judges that the specific subject is not included in the image, and for inputting the image data into the second high frequency filter in the case that the judging means judges that the specific subject is included in the image; and means for obtaining the focus evaluation value, based on the high frequency components output from the first or second high frequency filter.

10. A focusing position determining apparatus as defined in claim 9, further comprising:
filter control means, for obtaining the size of the specific subject, based on the output signal from the imaging means, and lowering the second cutoff frequency the greater the size of the subject is.

11. A focusing position determining apparatus as defined in claim 9, wherein:
the judging means judges whether a human face or a facial component that constitutes a human face is included in the image as the specific subject.

12. A focusing position determining apparatus as defined in claim 10, wherein:
the judging means judges whether a human face or a facial component that constitutes a human face is included in the image as the specific subject.

13. A focusing position determining apparatus to be employed in a photography device, comprising:
an imaging lens;
imaging lens moving means, for moving the imaging lens along the direction of the optical axis thereof within a range of motion; and
imaging means, for outputting an output signal that represents the contrast within an image;
the imaging lens, the imaging lens moving means, and the imaging means forming an automatic focusing mechanism that sets the imaging lens at a position at which a focus evaluation value that corresponds to the contrast within an image assumes a peak value;
the focusing position determining apparatus comprising:
a first high frequency filter that only transmits high frequency components having frequencies greater than or equal to a first cutoff frequency;
a second high frequency filter that only transmits high frequency components having frequencies greater than or equal to a second cutoff frequency, which is lower than the first cutoff frequency;
judging means, for judging whether an image represented by output signals of the imaging means includes a specific low contrast subject;
control means, for inputting image data that represents the image into the first high frequency filter in the case that the judging means judges that the specific subject is not included in the image, and for inputting the image data into the second high frequency filter in the case that the judging means judges that the specific subject is included in the image;
means for obtaining the focus evaluation value, based on the high frequency components output from the first or second high frequency filter; and
focus evaluation value selecting means, for judging whether the reliability of the focus evaluation value determined based on the high frequency components output from the second high frequency filter is greater than or equal to a reliability threshold value, outputting the focus evaluation value to be subjected to peak value detection if the reliability is greater than or equal to a predetermined reliability threshold value, inputting the image data through the first high frequency filter, obtaining a focus evaluation value based on the high frequency components transmitted by the first high frequency filter to be subjected to peak value detection if the reliability is less than the predetermined reliability threshold value.

14. A focusing position determining apparatus as defined in claim 13, further comprising:

filter control means, for obtaining the size of the specific subject, based on the output signal from the imaging means, and lowering the second cutoff frequency the greater the size of the subject is.

15. A focusing position determining apparatus as defined in claim 13, wherein:

the judging means judges whether a human face or a facial component that constitutes a human face is included in the image as the specific subject.

16. A focusing position determining apparatus as defined in claim 14, wherein:

the judging means judges whether a human face or a facial component that constitutes a human face is included in the image as the specific subject.

* * * * *